United States Patent [19]

Müller et al.

[11] Patent Number: 4,639,482

[45] Date of Patent: Jan. 27, 1987

[54] PHOSPHORIC ACID COMPOUNDS AS CO-STABILIZERS FOR ME(II)-CARBOXYLATES AND/OR ME(II)-PHENOLATES IN PVC

[75] Inventors: Horst Müller, Fürth/Odenwald; Horst Zinke, Ernsthofen; Wolfgang Wehner, Zwingenberg, all of Fed. Rep. of Germany

[73] Assignee: Ciba-Geigy Corporation, Ardsley, N.Y.

[21] Appl. No.: 477,183

[22] Filed: Mar. 21, 1983

[30] Foreign Application Priority Data

Mar. 25, 1982 [CH] Switzerland ............... 1842/82
Nov. 30, 1982 [CH] Switzerland ............... 6949/82

[51] Int. Cl.$^4$ ............................................. C08K 5/52
[52] U.S. Cl. ............................ 524/137; 524/327; 524/400
[58] Field of Search ........................................ 524/137

[56] References Cited

U.S. PATENT DOCUMENTS

| | | | |
|---|---|---|---|
| 2,723,965 | 11/1955 | Leistner et al. | 524/395 |
| 2,824,847 | 2/1958 | Fath | 524/146 |
| 4,189,453 | 2/1980 | Zinke et al. | 260/976 |
| 4,322,303 | 3/1982 | Rosenberger | 524/137 |

FOREIGN PATENT DOCUMENTS 2809492 9/1978 Fed. Rep. of Germany .

OTHER PUBLICATIONS

Christian H. Stapfer et al., "Antioxidative Stabilization of Polyvinyl Chloride"—ACS Division of Polymer Chemistry, Polymer Preprints, vol. 12, No. 1, 795-802, Mar. 1971.

Lally, R. E. et al., "Stabilization of Polyvinyl Chloride", Modern Plastics, Dec. 1949, pp. 111, 112, 114, 116, 156-162.

Chevassus, F. et al., Stabilization of Polyvinyl Chloride, pp. 61-73, 1963, St. Martins, Press. Inc., New York.

*Primary Examiner*—Veronica P. Hoke
*Attorney, Agent, or Firm*—Harry Falber

[57] ABSTRACT

Compositions for the stabilization of polyvinylchloride comprising blends or tri- and tetrathiophosphoric acid esters and at least one polyvinylchloride stabilizer of the type Me(II)-carboxylate and/or Me(II)-phenolate as well as the polyvinylchloride stabilized therewith.

7 Claims, No Drawings

PHOSPHORIC ACID COMPOUNDS AS CO-STABILIZERS FOR ME(II)-CARBOXYLATES AND/OR ME(II)-PHENOLATES IN PVC

The invention relates to a stabiliser mixture formed from tri- and tetrathiophosphoric acid esters and PVC-stabilisers of the type Me(II)-carboxylate and/or Me-(II)-phenolate, to the PVC stabilised therewith, and to the use thereof for stabilising PVC.

Known co-stabilisers for metal(II)-carboxylates and Me(II)-phenolates are for example triorganophosphites, polyols and antioxidants, which are discussed by Kurt Thinius in his book "Stabilisierung and Alterung von Plastwerkstoffen" ("Stabilising and Ageing of Plastics materials"), on pages 172, 281 and 517–530 [Verlag Chem. 1962, Vol. 1]. Further relevant known co-stabilisers are triorganothiophosphites, such as those described for example in the U.S. Pat. No. 2,824,847. None of these known co-stabilisers however have so far produced the desired stabilising effect. A considerable amount of damage to the PVC still occurs as a result of thermal stressing. The physical properties alter unfavourably during processing, and in the case where the co-stabilisers used are triorganothiophosphites, there is also a smell nuisance.

It has now been found that specific tri- and tetrathiophosphoric acid esters, as co-stabilisers for the known PVC stabilisers of the type Me(II)-carboxylate and Me(II)-phenolate, greatly improve the stabilising of PVC during processing, especially against damage caused by thermal stressing (hydrogen chloride separation and autooxidation).

Compared with the change in the physical properties of the PVC caused by the known mixtures, that caused by the stabiliser mixture of the present invention is far less, and the smell nuisance is furthermore largely eliminated.

The invention thus relates to a stabiliser mixture obtainable by mixing together at least one compound of the formula I

$$(ROOC-C_nH_{2n}S-)_3 PX \qquad (I)$$

wherein X is O or S, n is an integer from 1 to 5, and R is straight-chain or branched-chain $C_1$–$C_{18}$-alkyl or substituted or unsubstituted cyclohexyl, and at least one PVC stabiliser of the type Me(II)-carboxylate and/or Me(II)-phenolate, where Me(II) denotes one or more metals from the series: Ba, Sr, Ca, Mg, Zn and Cd, and wherein there are used, relative to the PVC, 0.01–2 percent by weight of the compound of the formula I and 0.1–4 percent by weight of the Me(II)-carboxylate and/or Me(II)-phenolate.

According to a preferred embodiment of the invention, there are additionally used at least one triorganophosphite of the formula II

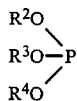

in which $R^2$, $R^3$ and $R^4$ are identical or (preferably) different, and are each straight-chain or branched-chain $C_4$–$C_{18}$-alkyl or a substituted or unsubstituted phenyl group, and/or at least one antioxidant, in which mixture there are contained, relative to the PVC: 0.01–2 percent by weight of the compound of the formula I, 0.1–4 percent by weight of the Me(II)-carboxylate and/or Me(II)-phenolate, 0.05–4 percent by weight of the phosphite of the formula II, and/or 0.01–1 percent by weight of the antioxidant.

R in the formula I can be the following alkyl groups: for example, methyl, isopropyl, n-butyl, sec-butyl, tert-butyl, tert-pentyl, 2-ethylhexyl, n-octyl, 1,1,3,3-tetramethylbutyl, n-dodecyl, 1,1,7,7-tetramethyloctyl and n-octadecyl. When R is a substituted cycloalkyl group, possible substituents are methyl and ethyl.

The $C_nH_{2n}$ group of the formula I, in which n is preferably 2 and particularly 1, can be straight-chain or branched-chain alkylene or alkylidene. Examples are especially: methylene, ethylene and ethylidene, as well as 1,2- or 1,3-propylene, 1,1- or 2,2-propylidene, butylene, butylidene, pentylene and pentylidene.

$R^2$, $R^3$ and $R^4$ in the formula II can be the same alkyl groups as the groups defined for R, with the exception of those having 1 to 3 C atoms. As substituted phenyl groups for $R^2$, $R^3$ and $R^4$, the same straight-chain or branched-chain alkyl groups have a definition identical to that given under R, in particular however: n-octyl, n-nonyl and n-dodecyl groups. $R^2$, $R^3$ and $R^4$ are preferably a phenyl group or a $C_8$–$C_{14}$-alkyl group.

Examples of metal carboxylates are the metal salts of saturated or unsaturated aliphatic carboxylic acid having 6 to 20 C atoms, or of such carboxylic acids substituted by hydroxyl groups, such as: hexanoic acid, heptanoic acid, octanoic acid, 2-ethylhexanoic acid, undecylic acid, lauric acid, myristic acid, palmitic acid, stearic acid, 12-oxystearic acid, oleic acid, linoleic acid or ricinoleic acid. Also of interest are the metal salts of aromatic carboxylic acids, for example substituted phenylbenzoates.

Suitable metal phenolates are in particular the metal salts of phenols having 6–20 C atoms, for example alkylphenols, such as p-tert-butyl-,p-octyl- p-nonyl- or p-dodecylphenol.

Examples of antioxidants are as follows:

1.1 alkylated monophenols, such as 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-i-butylphenol, 2,6-di-cyclopentyl-4-methylphenol, 2-(α-methylcyclohexyl)-4,6-dimethylphenol, 2,6-di-octadecyl-4-methylphenol, 2,4,6-tri-cyclohexylphenol and 2,6-di-tert-butyl-4-methoxymethylphenol;

1.2 alkylated hydroquinones, such as 2,6-di-tert-butyl-4-methoxyphenol, 2,5-di-tert-butyl-hydroquinone, 2,5-di-tert-pentyl-hydroquinone and 2,6-di-phenyl-4-octadecyloxyphenol;

1.3. hydroxylated thiodiphenyl ethers, such as 2,2'-thio-bis-(6-tert-butyl-4-methylphenol), 2,2'-thio-bis-(4-octylphenol), 4,4'-thio-bis-(6-tert-butyl-3-methylphenol) and 4,4'-thio-bis-(6-tert-butyl-2-methylphenol);

1.4-alkylidene-bisphenols, such as 2,2'-methylene-bis-(6-tert-butyl-4-methylphenol), 2,2'-methylene-bis-(6-tert-butyl-4-ethylphenol, 2,2'-methylene-bis-[4-methyl-6-(α-methylcyclohexyl)-phenol], 2,2'-methylene-bis-(4-methyl-6-cyclohexylphenol), 2,2'-methylene-bis-(6-nonyl-4-methylphenol), 2,2'-methylene-bis-(4,6-di-tert-butylphenol), 2,2'-ethylidene-bis-(4,6-di-tert-butylphenol), 2,2'-ethylidene-bis-(6-tert-butyl-4-isobutylphenol), 4,4'-methylene-bis-(2,6-di-tert-butylphenol), 4,4'-methylene-bis-(6-tert-butyl-2-methylphenol), 1,1-bis-(5'-tert-butyl-4'-hydroxy-2'-methylphenyl)-butane, 2,6-di-(3'-tert-butyl-5'-methyl-2'-hydroxybenzyl)-4-methylphenol, 1,1,3-tris-(5'-tert-butyl-4'-hydroxy-2'-methylphenyl)-butane, 1,1-bis-(5'-tert-butyl-4'-hydroxy-2'-methylphenyl)-3-n-dodecylmercaptobutane and 2,2-bis-(4'-hydroxyphenyl)-propane, ethylene-glycol-bis-[3,3-bis-(3'-tert-butyl-4'-hydroxyphenyl)-butyrate], di-(3-tert-butyl-4-hydroxy-5-methylphenyl)-dicyclopentadiene and di-[2-(3'-tert-butyl-2'-hydroxy-5'-methylbenzyl)-6-tert-butyl-4-methylphenyl]-terephthalate;

1.5 benzyl compounds, such as 1,3,5-tri-(3',5'-di-tert-butyl-4'-hydroxybenzyl)-2,4,6-trimethylbenzene, di-(3,5-di-tert-butyl-4-hydroxybenzyl)-sulfide, 3,5-di-tert-butyl-4-hydroxybenzyl-mercaptoacetic acid-isooctyl ester, bis-(4-tert-butyl-3-hydroxy-2,6-dimethylbenzyl)-dithiolterephthalate, 1,3,5-tris-(3',5'-di-tert-butyl-4'-hydroxybenzyl)-isocyanurate, 1,3,5-tris-(4'-tert-butyl-3'-hydroxy-2',6'-dimethylbenzyl)-isocyanurate, 3,5-di-tert-butyl-4-hydroxybenzyl-phosphonic acid-dioctadecyl ester and 3,5-di-tert-butyl-4-hydroxybenzyl-phosphonic acid-monomethyl ester calcium salt;

1.6. acylaminophenols, such as 4-hydroxy-lauric acid anilide, 4-hydroxystearic acid anilide and 2,4-bis-octyl-mercapto-6-(3',5'-di-tert-butyl-4'-(hydroxyanilino)-S-triazine;

1.7. esters of β-(3,5-di-tert-butyl-4-hydroxyphenyl)-propionic acid with mono- or polyhydric alcohols, such as with methanol, octadecanol, 1,6-hexanediol, neopentyl glycol, thiodiethylene glycol, diethylene glycol, triethylene glycol, pentaerythritol, tris-hydroxyethylisocyanurate and di-hydroxyethyl-oxalic acid diamide;

1.8. esters of β-(5-tert-butyl-4-hydroxy-3-methylphenyl)-propionic acid with mono- or polyhydric alcohols, such as with methanol, octadecanol, 1,6-hexanediol, neopentyl glycol, thiodiethylene glycol, diethylene glycol, triethylene glycol, pentaerythritol, tris-hydroxyethylisocyanurate and di-hydroxyethyl-oxalic acid diamide;

1.9. amides of β-(3,5-di-tert-butyl-4-hydroxyphenyl)-propionic acid, such as N,N,-di-(3,5-di-tert-butyl-4-hydroxyphenylpropionyl)-hexamethylenediamine, N,N'-di-(3,5-di-tert-butyl-4-hydroxyphenylpropionyl)-trimethylenediamine and N,N'-di-tert-butyl-4-hydroxyphenylpropionyl)-hydrazine.

Preferred antioxidants are alkylated monophenols, alkylidene-bisphenols and phenyl-substituted propionic acid esters, particularly however 2,6-di-tert-butyl-p-cresol, 2,2-bis-(4'-hydroxyphenyl)-propane and β-(3,5-di-tert-butyl-4-hydroxyphenyl)-propionic acid-n-octadecyl esters. They are preferably used in an amount of 0.01-0.3 percent by weight, relative to the amount of PVC.

The compounds of the formula I are known and for the most part are described in the German Offenlegungsschrift No. 2,809,492. When there are used such compounds of the formula I according to the invention which, with respect to their structure, are beyond the scope given in the German Offenlegungsschrift, analogous known processes are applied for the production of these compounds.

Also the triorganophosphites of the formula II, as well as the Me(II)-carboxylates, Me(II)-phenolates and the antioxidants are known, so that a discussion of the relevant production processes can in this case be dispensed with.

According to a further preferred embodiment of the present invention, there is used a compound of the formula I in which n is 1 or 2, the $C_nH_{2n}$ group being straight-chain when n is 2; and R is straight-chain or branched-chain $C_8$-$C_{18}$-alkyl.

Particularly suitable compounds of the formula I are those wherein X is oxygen.

A further preference is the use of a compound of the formula I wherein n is 1, and R is straight-chain or branched-chain $C_8$-$C_{17}$-alkyl.

According to yet a further preferred embodiment of the invention, there are used as the PVC-stabiliser, of the type Me(II)-carboxylate and/or Me(II)-phenolate, one or more compounds of the metals from the series Ba, Ca and Zn.

Preferred stabiliser mixtures are those in which there are used, relative to the amount of PVC: 0.1-1 percent by weight of the compound of the formula I; 0.2-3 percent by weight of the Me(II)-carboxylate and/or Me(II)-phenolate; and 0.1-2 percent by weight of the phosphite of the formula II.

Further subject matter of the present invention is stabilised PVC containing a stabiliser mixture, obtainable by mixing together at least one compound of the formula I, at least one Me(II)-carboxylate and/or -phenolate, where Me(II) denotes one or more metals from the series Ba, Sr, Ca, Mg, Zn and Cd, and additionally at least one triorganophosphite of the formula II and/or at least one antioxidant.

The present invention relates also to the use of the stabiliser mixture according to the invention for the stabilisation of PVC, whereby there are added to the PVC at least one compound of the formula I, at least one Me(II)-carboxylate and/or Me(II)-phenolate, and optionally in addition at least one triorganophosphite of the formula II, and/or at least one antioxidant, according to the aforementioned mixture proportions.

Vinyl chloride polymers or -copolymers are preferably used as the PVC. Suspension polymers and polymers produced by bulk polymerisation, and also emulsion polymers having a low emulsifier content, that is to say, washed emulsion polymers, are preferred. Suitable comonomers for the copolymers are for example: vinyl acetate, vinylidene chloride, transdichloroethane, ethylene, propylene, butylene, maleic acid, acrylic acid, fumaric acid and itaconic acid. Further suitable chlorine-containing thermoplasts are post-chlorinated PVC and chlorinated polyolefins, also graft polymers of PVC with EVA (ethylenevinyl acetate) and MBS (methacrylate-butadiene-styrene).

The incorporation of the stabiliser components into the PVC is effected most favourably, in the customary manner, on a two-roller mill at temperatures of between 150° and 200° C. A sufficient homogenisation is generally obtained within 5 to 15 minutes. The components can be added singly, or jointly as a premix. A liquid premix has proved advantageous, that is, the mixing is carried out in the presence of inert solvents and/or plasticisers.

It is possible during preliminary mixing for some of the compounds of the formula I to further react with one or more of the other components of the mixture; and this may result in additional products being formed, which themselves are effective as stabilisers.

The stabiliser mixtures after the mixing operation are usually filtered, preferably at elevated temperature, until clear.

The invention is further illustrated by the following Examples.

EXAMPLES 1 AND 2

The following basic recipe is used:

| | |
|---|---|
| S-PVC (K value 70; Solvic 271 GB ® (Fa. Solvay) | 100 parts by weight |
| dioctyl phthalate | 18 parts by weight |
| epoxidised soybean oil | 2 parts by weight |
| stabiliser | 2 parts by weight. |

The stabilisers of Examples 1 and 2 are composed as follows (amounts are given in all cases as parts by weight)

| | Example 1 | Example 2 |
|---|---|---|
| toluene | 10.0 | 10.0 |
| Zn oleate | 19.0 | 19.0 |
| Ba—p-tert-butyl benzoate | 18.0 | 18.0 |
| n-octadecyl-[3-(3′, 5′-di-tert-butyl-4′-hydroxyphenyl)-propionate] | 4.4 | 4.4 |
| didecylphenyl phosphite | 40.0 | 40.0 |
| $(\text{i-}C_8H_{17}OOC-CH_2S-)_3PS$ | 9.0 | — |
| $(\text{i-}C_8H_{17}OOC-CH_2S-)_3PO$ | — | 9.0 |

A long-duration roll test is carried out at 190° C., whereby the above-given basic recipe is firstly plasticised at constant temperature (190° C.) for 5 minutes on mixing rolls, and specimens are subsequently cut, at intervals of 5 minutes, from the centre of the sheet (0.3 mm thickness). The Yellowness Index is afterwards determined according to ASTM D 1925-70. The test results are summarised in Table 1.

TABLE 1

| Rolling time | 5′ | 10′ | 15′ | 20′ | 25′ | 30′ | 35′ | 40′ | 45′ | 50′ | 55′ | 60′ |
|---|---|---|---|---|---|---|---|---|---|---|---|---|
| Ex. 1 | 4,3 | 4,7 | 5,6 | 7,1 | 7,7 | 8,7 | 9,8 | 10,6 | 13,2 | 16,3 | 24,4 | 37,5 |
| Ex. 2 | 3,0 | 3,9 | 4,4 | 5,8 | 6,3 | 7,4 | 9,8 | 13,8 | 17,8 | 29,5 | 55,6 | — |

EXAMPLES 3 AND 4

The following basic recipe is used:

| | |
|---|---|
| S-PVC (K value 70; Solvic 271 GB ® | 100 parts by weight |
| dioctyl phthalate | 18.0 parts by weight |
| epoxidised soybean oil | 2.0 parts by weight |
| Ba—p-tert-butyl benzoate | 0.4 part by weight |
| Zn stearate | 0.4 part by weight |
| n-octadecyl-[3-(3′, 5′-di-tert-butyl-4′-hydroxyphenyl)-propionate] | 0.1 part by weight |
| compound of the formula I | 1.0 part by weight. |

The following compounds of the formula I are used:
Example 3:

$(\text{i-}C_8H_{17}OOC-CH_2S-)_3PS$

Example 4:

$(\text{i-}C_8H_{17}OOC-CH_2S-)_3PO$

The long-duration roll test is carried out at 190° C. as in Examples 1 and 2. The test results are summarised in Table 2.

TABLE 2

| Rolling time | 5′ | 10′ | 15′ | 20′ | 25′ | 30′ | 35′ | 40′ | 45′ | 50′ |
|---|---|---|---|---|---|---|---|---|---|---|
| Ex. 3 | 4,4 | 6,7 | 10,6 | 14,9 | 20,5 | 24,7 | 34,6 | 50,9 | 58,5 | 65,9 |
| Ex. 4 | 2,9 | 5,3 | 8,5 | 14,0 | 25,3 | 47,1 | 59,0 | 71,9 | 100 | 120 |
| without co-stabiliser of the formula I | 11,4 | 24,1 | 33,1 | 38,4 | 40,0 | 38,4 | 38,7 | 120 | — | — |

EXAMPLES 5–8

The following basic recipe is used:

| | |
|---|---|
| S-PVC (K value 70; Solvic 271 GB ®) | 100 parts by weight |
| dioctyl phthalate | 18 parts by weight |
| epoxidised soybean oil | 2 parts by weight |
| basic stabiliser | 2 parts by weight |
| co-stabiliser of the formula I according to the invention | 0.2 part by weight |

Composition of the basic stabiliser (2 parts by weight)

15% by weight of an aromatic hydrocarbon (Shell Sol A ®)
30% by weight of calcium oleate
16% by weight of zinc oleate
36% by weight of didecylphenyl phosphite
3% by weight of 2,2-bis-(4′-hydroxyphenyl)-propane (Bisphenol A ®)

The following co-stabilisers of the formula I are used:
Example 5:

$(\text{i-}C_8H_{17}OOC-CH_2S-)_3PO,$

EXAMPLE 6:

$(\text{n-}C_6H_{13}OOC-CH_2S-)_3PO,$

Example 7:

$(\text{n-}C_{12}H_{25}OOC-CH_2S-)_3PO,$

Example 8:

$[\text{n-}C_8H_{17}OOC-CH(CH_3)S-]_3PO.$

After a rolled sheet has been produced on mixing rolls at 180° C. for 5 minutes, with the above-given basic recipe, a static heat test at 180° C. is carried out, the test comprising cutting specimens (0.3 mm thick) from the rolled sheet, laying them out on glass plates (1 mm thick), and subjecting the specimens to heat in a heating chamber. A specimen is taken every 5 minutes for the purpose of measuring the Yellowness Index according to ASTMD 1925-70. There are also produced pressed plates according to DIN 53490 for the measurement of transparency and of the degree of yellowing.

Test results of the static heat test

TABLE 3

| Rolling time in min. | 0' | 5' | 10' | 15' | 20' | 25' | 30' | 35' | 40' | 45' | 50' | 55' | 60' |
|---|---|---|---|---|---|---|---|---|---|---|---|---|---|
| without co-stabiliser | 8,3 | 11,5 | 11,6 | 12,4 | 13,3 | 14,1 | 14,6 | 14,6 | 14,6 | 14,6 | 14,6 | 19,1 | 60,1 |
| Ex. 5 | 4,3 | 6,6 | 6,6, | 8,3 | 8,3 | 8,3 | 8,7 | 8,9 | 10,9 | 10,7 | 12,7 | 20,0 | 36,4 |
| Ex. 6 | 4,8 | 6,5 | 6,5 | 6,9 | 8,3 | 8,9 | 8,9 | 8,9 | 12,4 | 12,4 | 15,4 | 23,4 | 38,3 |
| Ex. 7 | 3,9 | 5,5 | 5,8 | 7,2 | 7,2 | 9,2 | 9,6 | 9,6 | 10,9 | 11,2 | 13,4 | 23,1 | 35,3 |
| Ex. 8 | 6,2 | 8,0 | 8,5 | 11,6 | 11,6 | 11,6 | 11,6 | 11,6 | 11,6 | 11,6 | 12,7 | 16,1 | 27,3 |

Test results from the pressed-plate tests

TABLE 4

| Co-stabiliser of the formula I | Yellowing, YI ASTM D 1925-70 | Transparency according to ASTM D 2805-70 (constrast ratio)* |
|---|---|---|
| without co-stabiliser | 42,6 | 9,8 |
| Ex. 5 | 27,0 | 8,4 |
| Ex. 6 | 25,8 | 7,2 |
| Ex. 7 | 23,7 | 5,6 |
| Ex. 8 | 33,0 | 9,5 |

*contrast ratio = remission of the sheet against black background / remission of the sheet against white background; a shigh contrast ratio denotes poor transparency

EXAMPLES 9–10

The same basic recipe as in Examples 5–8 is used; and there is chosen for the basic stabiliser a commercial Ba/Zn stabiliser mixture of the following composition:

8.4% by weight of an aromatic hydrocarbon (Shell Sol. A ®),
29.0% by weight of barium-p-tert-butylbenzoate,
25.2% by weight of zinc oleate,
34.4% by weight of didecylphenyl phosphate, and
3.0% by weight of 2,6-di-tert-butyl-p-cresol (BHT).

The following co-stabilisers of the formula I are used:

Example 9:

(n—$C_6H_{13}$OOC—$CH_2CH_2$S—$)_3$PO,

Example 10:

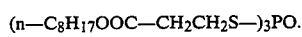
(n—$C_8H_{17}$OOC—$CH_2CH_2$S—$)_3$PO.

A long-duration roll test is performed at 190° C. according to Examples 5–8, and the Yellowness Index is determined according to ASTM D 1925-70. The test results are summarised in Table 5.

TABLE 5

| Rolling time in min. | 5' | 10' | 15' | 20' | 25' | 30' | 35' | 40' |
|---|---|---|---|---|---|---|---|---|
| without | 10,2 | 15,6 | 15,8 | 15,4 | 14,1 | 13,6 | 16,1 | 53,4 |
| co-stabiliser | | | | | | | | |
| Ex. 9 | 7,2 | 9,5 | 10,6 | 10,8 | 11,2 | 11,9 | 14,8 | 52,5 |
| Ex. 10 | 6,5 | 8,9 | 10,4 | 10,8 | 10,7 | 11,1 | 18,7 | 60,6 |

EXAMPLES 11–13

The same basic recipe as in Examples 5–8 is used, and in the basic stabiliser is used a barium-nonylphenolate of the following composition:

19.9% by weight of tripropylene glycol monomethyl ether,
30.9% by weight of barium-p-nonylphenolate
15.6% by weight of zinc versatate (Zn salt of versatic-10-acid ®, Shell),
30.9% by weight of didecylphenyl phosphite, and
2.7% by weight of 2,6-di-tert-butyl-p-cresol (BHT).

The static heat test at 180° C. and the pressed-plate test are performed as in Examples 5–8. The test results are summarised in Tables 6 and 7.

Static heat test

TABLE 6

(Yellowness Index according to ASTM D 1925-70)

| Rolling time in min. | 0' | 5' | 10' | 15' | 20' | 25' | 30' | 35' | 40' | 45' | 50' | 55' | 60' | 65' | 70' |
|---|---|---|---|---|---|---|---|---|---|---|---|---|---|---|---|
| without co-stabiliser | 10,5 | 19,9 | 22,3 | 30,9 | 37,7 | 35,5 | 36,9 | 33,9 | 33,2 | 29,4 | 25,4 | 22,7 | 27,0 | * | * |
| Ex. 11 | 3,6 | 5,3 | 9,4 | 13,5 | 19,4 | 21,9 | 23,2 | 24,9 | 25,2 | 21,8 | 20,5 | 18,2 | 18,1 | 27,7 | 62,8 |
| Ex. 12 | 3,5 | 6,1 | 10,8 | 15,0 | 20,3 | 21,4 | 23,2 | 24,0 | 22,9 | 22,3 | 21,2 | 18,9 | 18,1 | 32,9 | 41,2 |
| Ex. 13 | 3,1 | 4,1 | 7,5 | 12,6 | 16,2 | 20,9 | 21,8 | 23,2 | 23,3 | 22,5 | 21,4 | 19,5 | 18,5 | 27,0 | 50,5 |

* = decomposition of the rolled sheet (hide)

Example 11:

(i—$C_8H_{17}$OOC—$CH_2$S—$)_3$PO

Example 12:

(n—$C_6H_{13}$OOC—$CH_2$S—$)_3$PO

Example 13:

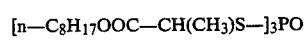
[n—$C_8H_{17}$OOC—$CH(CH_3)$S—$]_3$PO

TABLE 7

Pressed-plate test (measurement of yellowing and of transparency)

| Co-stabiliser of the formula I | Yellowing YI, ASTM D 1925-70 | Transparency according to ASMD D 2805-70 (contrast ratio) |
|---|---|---|
| without co-stabiliser | 61,5 | 2,1 |
| Ex. 11 | 22,0 | 1,0 |

TABLE 7-continued

Pressed-plate test (measurement of yellowing and of transparency)

| Co-stabiliser of the formula I | Yellowing YI, ASTM D 1925-70 | Transparency according to ASMD D 2805-70 (contrast ratio) |
| --- | --- | --- |
| Ex. 12 | 23,1 | 0,7 |
| Ex. 13 | 19,1 | 0,9 |

What is claimed is:

1. A stabilized composition comprising polyvinyl chloride and a stabilizer mixture comprising at least one compound of the formula I $$[ROOC-C_nH_{2n}S-]_3 PX \quad (I)$$

wherein X is O or S, n is an integer from 1 to 5, and R is straight-chain or branched-chain $C_1$-$C_{18}$-alkyl or substituted or unsubstituted cyclohexyl, and at least one polyvinyl chloride stabilizer of the type Me(II)-carboxylate and/or Me(II)-phenolate, where Me(II) denotes one or more metals from the series: Ba, Sr, Ca, Mg, Zn and Cd, and wherein there are used, relative to the polyvinyl chloride, 0.01-2 percent by weight of the compound of the formula I and 0.1-4 percent by weight of the Me(II)-carboxylate and/or Me(II)-phenolate.

2. The composition according to claim 1, wherein n is 1 or 2, and R is straight-chain or branched chain $C_8$-$C_{18}$-alkyl.

3. The composition according to claim 1, wherein n is 1, and R is straight-chain or branched-chain $C_8$-$C_{17}$-alkyl.

4. The composition according to claim 1, wherein said metal is Ba, Ca or Zn.

5. The composition according to claim 1, which also contains at least one triorganophosphite of the formula II

in which $R^2$, $R^3$ and $R^4$ are identical or different, and are straight-chain $C_4$-$C_{18}$-alkyl or a substituted or unsubstituted phenyl group, and/or concomitantly at least one antioxidant, the respective concentrations being, relative to the polyvinyl chloride, 0.01-2 percent by weight of the compound of the formula I, 0.1-4 percent by weight of the Me(II)-carboxylate and/or Me(II)-phenolate, 0.05-4 percent by weight of the phosphite of formula II, and/or 0.01-1 percent by weight of the antioxidant.

6. The composition according to claim 5, wherein said antioxidant is 0.01-0.3 percent by weight, relative to the polyvinyl chloride, of 2,6-di-tert-butyl-p-cresol, β-(3,6-di-tert-butyl-4-hydroxyphenyl)-propionic acid-n-octadecyl ester or 2,2-bis-(4'-hydroxyphenyl)-propane.

7. The composition according to claim 5, which contains, relative to the polyvinyl chloride, 0.01-1 percent by weight of the compound of formula I, 0.2-3 percent by weight of the Me(II)-carboxylate and/or of the Me(II)-phenolate, and 0.1-2 percent by weight of the triorganophosphite of formula II.

* * * * *